Jan. 17, 1950 A. G. KUELLMAR 2,495,011
POWER TAKE-OFF DEVICE
Filed July 20, 1945 2 Sheets-Sheet 1
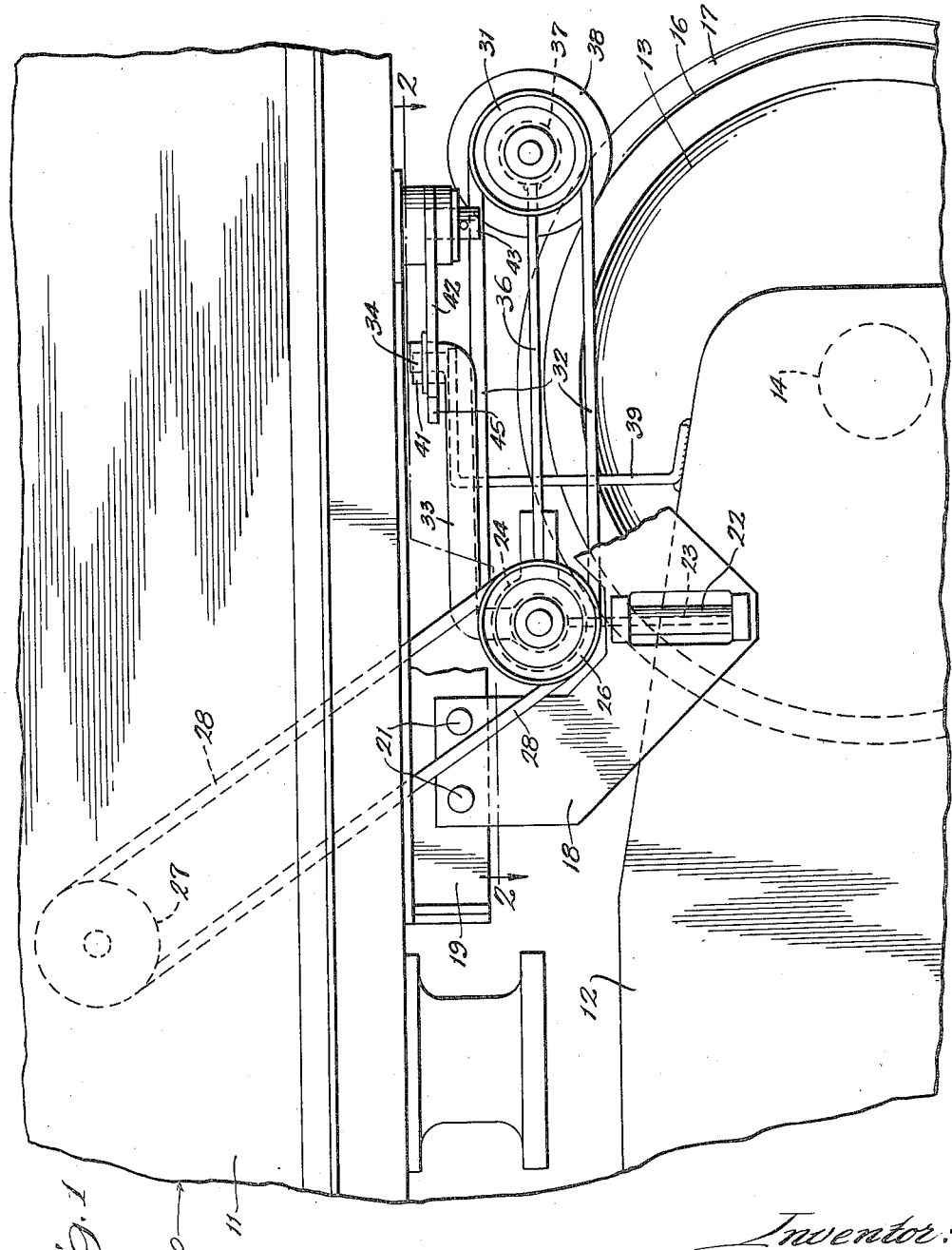
Inventor:
Adolph G. Kuellmar,
By Dawson, Ooms and Booth,
Attorneys.

Jan. 17, 1950 A. G. KUELLMAR 2,495,011
POWER TAKE-OFF DEVICE
Filed July 20, 1945 2 Sheets-Sheet 2
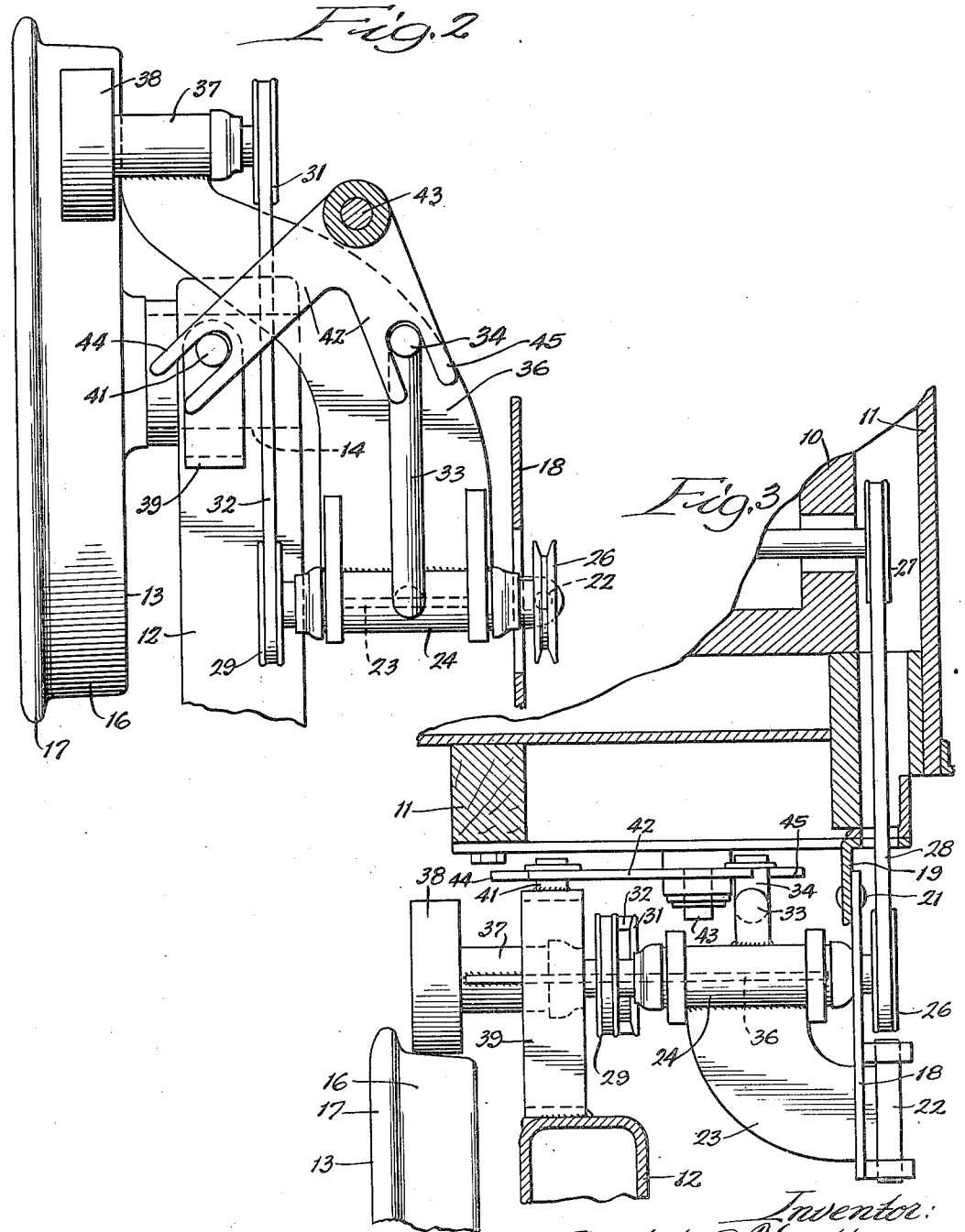
Inventor:
Adolph G. Kuellmar,
By Dawson, Ooms my Booth,
Attorneys.

Patented Jan. 17, 1950

2,495,011

UNITED STATES PATENT OFFICE 2,495,011

POWER TAKE-OFF DEVICE

Adolph G. Kuellmar, Chicago, Ill., assignor to Union Asbestos & Rubber Co., Chicago, Ill.

Application July 20, 1945, Serial No. 606,094

8 Claims. (Cl. 105—112)

The invention relates to power take-offs and more particularly to a mechanism for use with a railway car to drive an auxiliary device from the wheel of the car.

In providing a power take-off device for a railway car, the relative movement of the car truck to the car body is important as the car wheel is pivoted with the truck. The take-off roller in the conventional railway car construction is supported by the car body and does not move as the car truck is pivoted. It is necessary, therefore, to provide means for insuring an alignment of the take-off roller with the car wheel during the movement of a car truck.

It is an object of the invention to provide an improved take-off device for railway cars.

It is a further object of the invention to provide a take-off device for railway cars in which means is provided for maintaining a substantial alignment of the take-off roller with the car wheel during movement of the car truck.

It is also an object of the invention to provide a take-off device for railway cars in which movement of the car truck automatically pivots the take-off device so as to maintain substantial alignment of the take-off roller with the car wheel.

Further objects and advantages will be apparent from the following description and the drawings appended thereto.

In the drawings, in which like reference characters refer to like parts:

Fig. 1 is a fragmentary side view in elevation of one embodiment of the invention;

Fig. 2 is a view taken on lines 2—2 of Fig. 1; and

Fig. 3 is a fragmentary front view in elevation of the embodiment illustrated in Fig. 1.

In the preferred embodiment of the invention as illustrated in the drawings, the railway car 10 comprises car body 11 and car truck 12. The truck 12 includes car wheel 13 rotatably supported on axle 14. The car wheel is formed with rim 16 and flange 17.

The take-off device is supported by the car body 11. Thus, hinge support 18 is secured to flange 19 of the car body by fastening means 21. Hinge 22 is secured to support 18 and pivots bracket 23 horizontally. The bracket carries extension bearing 24 which extends laterally from the outside of the car toward the wheel. Auxiliary extension pulley 26 is rotatably supported by extension bearing 24, the pulley being in alignment with pulley 27 of the auxiliary mechanism. Pulleys 26 and 27 are in driving relationship by means of belt 28.

Take-off extension pulley 29 is also supported by extension bearing 24 and is in alignment with take-off pulley 31. Pulleys 29 and 31 are also in driving realtionship by means of belt 32.

Extension bearing 24 also supports pin 33 which extends upwardly from the bearing and lengthwise of the car toward the take-off pulley. Take-off pin 33 is formed with an upper vertical portion 34.

Supporting plate 36 extends from the extension bearing 24 and supports take-off bearing 37. Take-off pulley 31, which is carried by the take-off bearing, is driven by take-off roller 38. The take-off roller is a wheel having an edge of substantial width preferably covered with a material having good frictional qualities such as rubber or the like. The take-off roller is adapted to frictionally engage the rim portion 16 of the car wheel.

With the car truck in its normal position, the car wheel drives the roller 38 to drive the auxiliary mechanism through pulleys 31, 29, 26, and 27 and belts 32 and 28. When the car turns, as on a curved section of track, the car wheel moves laterally relative to the car body due to the fact that it is spaced from the pivotal connection between the truck and the car body. Thus, unless the take-off roller is moved to follow movement of the wheel, driving engagement between the roller and wheel will be interrupted.

In order to move the roller to maintain it in contact with the wheel during turning, the take-off device is turned about the pivot 22. For this purpose a member 39 is secured to the car truck and carries pin 41 which extends upwardly from member 39. To transmit the movement of pin 41 to the take-off device, a bell-crank lever 42 is pivoted to the car body at 43 and has its ends formed into yokes 44 and 45 which engage pins 41 and 33 respectively.

With pins 41 and 33 engaged by the bell-crank, movement of the car truck causes the entire take-off device to pivot about hinge 22 when the car turns so that the take-off roller 38 is maintained in substantial alignment with the car wheel. Auxiliary extension pulley 26 is in alignment with the axis of the hinge 22 as shown so that it will only turn slightly as the take-off device pivots. Therefore, connection of pulleys 26 and 27 by belt 28 will not be interfered with.

The above detailed description is given for purposes of illustration and the invention is to be limited only by the scope of the appended claims.

I claim:

1. A railway car construction which comprises a car truck assembly, a take-off assembly and means for aligning the truck assembly and the take-off assembly, said truck assembly comprising a car truck, a car wheel rotatably secured to the truck, and a pin rigidly secured to the truck, said take-off assembly comprising a take-off roller, a take-off pulley driven by the take-off roller, a pulley in driving engagement with the take-off pulley, and a pin rigidly secured to the take-off assembly, and said aligning means comprising means pivotally secured to the car body and in pivotal engagement with the pins.

2. In a railway car construction, a take-off device which comprises a take-off assembly secured to the car body, an auxiliary mechanism driven by the take-off device, a truck assembly including a car wheel adapted to drive the take-off device, said take-off assembly comprising a bracket pivotally supporting the assembly, an auxiliary bearing supporting a take-off extension pulley and an auxiliary extension pulley, a pin secured to the extension bearing, a supporting plate extending horizontally from the extension bearing and supporting the take-off bearing, and a take-off roller supported by the take-off and bearing and driving a take-off pulley, said truck assembly including a pin secured to the truck, and means secured to the car body and in pivotal engagement with the pins to align the take-off assembly and the truck assembly.

3. A power take-off for a railway car having a body, a truck pivoted to the body and a rail engaging wheel on the truck, said take-off comprising a support pivoted on the car body on an axis parallel to the truck pivotal axis, a take-off roller rotatably carried by the support in a position to engage the wheel, and means operatively connecting the truck and the support and operated by pivotal movement of the truck relative to the body to turn the support about its pivotal mounting thereby to maintain the roller in engagement with the wheel.

4. A power take-off for a railway car having a body, a truck pivoted to the body and a rail engaging wheel on the truck comprising a support pivoted on the car body, a take-off roller rotatably carried by the support on an axis displaced from the pivotal axis of the support, a pulley on the support on an axis intersecting the pivotal axis of the support, means drivably connecting the roller and the pulley, and means operated by pivotal movement of the truck relative to the car body to turn the support about its pivot thereby to maintain the roller in engagement with the wheel.

5. A power take-off for a railway car having a body, a truck pivoted to the body and a rail engaging wheel on the truck comprising a support pivoted on the car body, spaced parallel bearings on the support the axis of one of which intersects the pivotal axis of the support, a pulley supported by said one of the bearings with its center plane substantially coincident with the pivotal axis of the support, a roller supported by the other of the bearings in a position to engage the wheel, means drivably to connect the roller and the pulley, and means operated by movement of the truck relative to the car body to turn the support about its pivotal mounting thereby to maintain the roller in engagement with the wheel.

6. A power take-off for a railway car having a body, a truck pivoted to the body and a rail engaging wheel on the truck said take-off comprising a support pivoted on the car body on an axis parallel to the truck pivotal axis, a roller rotatably carried by the support in a position to engage the wheel, and a lever pivotally connected to the support, the car body and the truck to turn the support about its pivotal mounting as the truck turns relative to the car body thereby to maintain the roller in engagement with the wheel.

7. A power take-off for a railway car having a body, a truck pivoted on the body and a rail engaging wheel on the truck, said take-off comprising a support pivoted on the car body on a vertical axis, a take-off roller rotatably mounted on the support on a horizontal axis displaced from the vertical axis to engage the wheel, and means operatively connecting the truck and the support and operated by pivotal movement of the truck relative to the body to turn the support about the vertical axis to maintain the roller in engagement with the wheel.

8. A power take-off for a railway car having a body, a truck pivoted on the body and a rail engaging wheel on the truck, said take-off comprising a support pivoted on the car body on a vertical axis, a take-off roller rotatably mounted on the support on a horizontal axis displaced from the vertical axis to engage the wheel, and a lever pivoted on the car body and engaging the truck and the support to turn the support about its vertical axis as the truck turns relative to the car body.

ADOLPH G. KUELLMAR.

REFERENCES CITED

The following references are of record in the file of this patent:

UNITED STATES PATENTS

| Number | Name | Date |
|---|---|---|
| 814,293 | Johnson | Mar. 6, 1906 |
| 1,025,506 | Bliss | May 7, 1912 |
| 2,275,166 | Bancroft | Mar. 3, 1942 |